US012753296B2

(12) United States Patent
Shindo et al.

(10) Patent No.: US 12,753,296 B2
(45) Date of Patent: Oct. 6, 2026

(54) RUBBER COMPOSITION AND CROSSLINKED RUBBER MOLDED PRODUCT

(71) Applicant: Sumitomo Rubber Industries, Ltd., Kobe (JP)

(72) Inventors: Ayaka Shindo, Kobe (JP); Takumi Kaneko, Kobe (JP); Hiroshi Tadaoka, Kobe (JP); Kazuyoshi Shiga, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 523 days.

(21) Appl. No.: 18/377,435

(22) Filed: Oct. 6, 2023

(65) Prior Publication Data

US 2024/0132705 A1 Apr. 25, 2024

(30) Foreign Application Priority Data

Oct. 7, 2022 (JP) ................................ 2022-162375

(51) Int. Cl.

*C08L 9/00* (2006.01)
*C08K 5/00* (2006.01)
*C08K 5/47* (2006.01)
*A63B 37/00* (2006.01)

(52) U.S. Cl.

CPC .............. *C08L 9/00* (2013.01); *C08K 5/0025* (2013.01); *C08K 5/47* (2013.01); *A63B 37/005* (2013.01)

(58) Field of Classification Search

CPC ......... C08L 9/00; C08K 5/0025; C08K 3/011; C08K 3/24; C08K 3/28; C08K 3/30
See application file for complete search history.

(56) References Cited

U.S. PATENT DOCUMENTS

| | | | | |
|---|---|---|---|---|
| 3,061,574 A * | 10/1962 | Smith | C08G 18/675 528/65 |
| 5,326,515 A * | 7/1994 | Sakaki | B29C 41/14 264/301 |
| 12,344,690 B2 | 7/2025 | Tadaoka et al. | |
| 2004/0248669 A1 | 12/2004 | Kim et al. | |
| 2004/0248670 A1 | 12/2004 | Okamoto et al. | |
| 2022/0411606 A1* | 12/2022 | Tadaoka | C08K 5/47 |

FOREIGN PATENT DOCUMENTS

| | | |
|---|---|---|
| JP | 2005-647 A | 1/2005 |
| JP | 2005-657 A | 1/2005 |
| JP | 2008179812 * | 8/2008 |
| JP | 7793942 B2 | 1/2026 |

OTHER PUBLICATIONS

Translation of JP2008179812 (Year: 2008).*
Naebpetch, J. Rubb. Res. 20(2), 71-86, 2017 (Year: 2017).*
Japanese Office Action for Japanese Application No. 2022-162375, dated May 19, 2026, with English translation.

* cited by examiner

*Primary Examiner* — Robert C Boyle
(74) *Attorney, Agent, or Firm* — Birch, Stewart, Kolasch & Birch, LLP

(57) ABSTRACT

An object of the present disclosure is to provide a rubber composition from which a crosslinked rubber molded product having excellent resilience performance can be obtained. The present disclosure provides a rubber composition containing (a) a base rubber, (b) a co-crosslinking agent, and (c) a crosslinking initiator, wherein (b) the co-crosslinking agent includes (b1) a metal complex, and (b1) the metal complex is composed of (b11) a metal component, (b12) a ligand derived from an α,β-unsaturated carboxylic acid compound having 3 to 8 carbon atoms, and (b13) a ligand derived from a mercaptobenzothiazole-based compound.

19 Claims, No Drawings

RUBBER COMPOSITION AND CROSSLINKED RUBBER MOLDED PRODUCT

FIELD OF THE DISCLOSURE

The present disclosure relates to a rubber composition, and particularly relates to a rubber composition containing a novel co-crosslinking agent.

DESCRIPTION OF THE RELATED ART

As a material for forming a core of a golf ball, a rubber composition containing a base rubber, a co-crosslinking agent and a crosslinking initiator is widely used in view of its good resilience.

For example, JP 2005-000647 A discloses a golf ball comprising a composition containing an unsaturated polymer, a crosslinking agent, a peptizer which is a non-metal salt of an organic sulfur compound, and an accelerator selected from the group consisting of 2-mercaptobenzothiazole and a salt of 2-mercaptobenzothiazole.

In addition, JP 2005-000657 A discloses a golf ball comprising a composition containing an unsaturated polymer, a crosslinking agent, a peptizer, and a vulcanization accelerator, wherein the vulcanization accelerator is selected from the group consisting of 2-mercaptobenzothiazole and a salt of 2-mercaptobenzothiazole.

SUMMARY OF THE DISCLOSURE

Although various rubber compositions have been proposed for forming a core of a golf ball, further improvement in the resilience performance of the core is desired. The present disclosure has been achieved in view of the above circumstances, and an object of the present disclosure is to provide a rubber composition for providing a crosslinked rubber molded product having excellent resilience performance.

The present disclosure that has solved the above problems provides a rubber composition containing (a) a base rubber, (b) a co-crosslinking agent, and (c) a crosslinking initiator, wherein (b) the co-crosslinking agent includes (b1) a metal complex, and (b1) the metal complex is composed of (b11) a metal component, (b12) a ligand derived from an α,β-unsaturated carboxylic acid compound having 3 to 8 carbon atoms, and (b13) a ligand derived from a mercaptobenzothiazole-based compound. If (b1) the metal complex is contained as the co-crosslinking agent, the obtained crosslinked rubber molded product has improved resilience performance.

If the rubber composition according to the present disclosure is used, a crosslinked rubber molded product having excellent resilience performance is obtained.

DESCRIPTION OF PREFERRED EMBODIMENTS

[Rubber Composition]

The present disclosure provides a rubber composition containing (a) a base rubber, (b) a co-crosslinking agent, and (c) a crosslinking initiator, wherein (b) the co-crosslinking agent includes (b1) a metal complex, and (b1) the metal complex is composed of (b11) a metal component, (b12) a ligand derived from an α,β-unsaturated carboxylic acid compound having 3 to 8 carbon atoms, and (b13) a ligand derived from a mercaptobenzothiazole-based compound.

Next, the materials used in the rubber composition will be explained.

((a) Base Rubber)

As (a) the base rubber, a natural rubber and/or a synthetic rubber can be used Examples of the synthetic rubber include a diene rubber such as polybutadiene rubber (BR), polyisoprene rubber (IR), styrene-polybutadiene rubber (SBR), chloroprene rubber (CR), butyl rubber (IIR), and acrylonitrile-butadiene rubber (NBR); and a non-diene rubber such as ethylene-propylene rubber (EPM), ethylene-propylene-diene rubber (EPDM), urethane rubber, silicone rubber, acrylic rubber, epichlorohydrin rubber, polysulfide rubber, fluorinated rubber, and chlorosulfonated polyethylene rubber. The rubber may be used solely, or two or more of them may be used in combination.

(a) The base rubber preferably contains the natural rubber and/or the diene rubber. The total amount of the natural rubber and/or the diene rubber in (a) the base rubber is preferably 50 mass % or more, more preferably 70 mass % or more, and even more preferably 90 mass % or more. It is also preferable that (a) the base rubber consists of the natural rubber and/or the diene rubber.

(a) The base rubber preferably includes a polybutadiene rubber, and particularly preferably includes a high-cis polybutadiene having a cis-1,4 bond in an amount of 40 mass % or more, preferably 80 mass % or more, and more preferably 90 mass % or more in view of its superior resilience. The amount of the high-cis polybutadiene in (a) the base rubber is preferably 50 mass % or more, more preferably 70 mass % or more.

The amount of the 1,2-vinyl bond in the high-cis polybutadiene is preferably 2.0 mass % or less, more preferably 1.7 mass % or less, and even more preferably 1.5 mass % or less. If the amount of the 1.2-vinyl bond is 2.0 mass % or less, the rubber molded product has further enhanced resilience.

The high-cis polybutadiene is preferably a polybutadiene synthesized using a rare earth element catalyst. When a neodymium catalyst, which employs a neodymium compound that is a lanthanum series rare earth element compound, is used, a polybutadiene rubber having a high content of a cis-1,4 bond and a low content of a 1,2-vinyl bond is obtained with excellent polymerization activity. Such a polybutadiene rubber is particularly preferred.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw/Mn) of the high-cis polybutadiene is 2.0 or more, the molding processability is enhanced. If the molecular weight distribution (Mw/Mn) of the high-cis polybutadiene is 6.0 or less, the obtained molded product has further enhanced resilience. It is noted that the measurement of the molecular weight distribution is conducted by gel permeation chromatography ("HLC-8120GPC", available from Tosoh Corporation) using a differential refractometer as a detector under the conditions of column: GMHHXL (available from Tosoh Corporation), column temperature: 40° C., and mobile phase: tetrahydrofuran, and calculated by converting based on polystyrene standard.

The Mooney viscosity ($ML_{1+4}$ (100° C.)) of the high-cis polybutadiene is preferably 30 or more, more preferably 32 or more, and even more preferably 35 or more, and is preferably 140 or less, more preferably 120 or less, even more preferably 100 or less, and most preferably 80 or less. It is noted that the Mooney viscosity ($ML_{1+4}$ (100° C.)) in the present disclosure is a value measured according to JIS K6300 using an L rotor under the conditions of: a preheating time of 1 minute; a rotor revolution time of 4 minutes; and a temperature of 100° C.

((b) Co-Crosslinking Agent)

(b) The co-crosslinking agent has an action of crosslinking a rubber molecule by graft polymerization to a base rubber molecular chain (b) The co-crosslinking agent includes (b1) the metal complex. If (b1) the metal complex having the specific ligand is contained as (b) the co-crosslinking agent, the obtained crosslinked rubber molded product has improved resilience performance.

(b1) The metal complex is composed of (b11) a metal component, (b12) a ligand derived from an α,β-unsaturated carboxylic acid compound having 3 to 8 carbon atoms, and (b13) a ligand derived from a mercaptobenzothiazole-based compound.

Examples of (b11) the metal component include an alkali metal such as lithium, sodium, potassium, rubidium, and cesium; an alkaline earth metal such as calcium, strontium, and barium; a transition metal such as scandium, titanium, vanadium, chrome, manganese, iron, cobalt, nickel, copper, yttrium, zirconium, niobium, molybdenum, technetium, ruthenium, rhodium, palladium, silver, hafnium, tantalum, tungsten, rhenium, osmium, iridium, platinum, and gold; and a base metal such as beryllium, magnesium, aluminum, zinc, gallium, cadmium, indium, tin, thallium, lead, bismuth, and polonium. (b11) The metal component may be used solely, or at least two of them may be used in combination. Among them, as (b11) the metal component, a metal having an oxidation number of +2 is preferable, beryllium, magnesium, calcium, zinc, barium, cadmium and lead are more preferable.

(b12) The ligand derived from the α,β-unsaturated carboxylic acid compound having 3 to 8 carbon atoms has a structure in which the hydrogen atom of the carboxy group of the α,β-unsaturated carboxylic acid having 3 to 8 carbon atoms is dissociated. Examples of the α,β-unsaturated carboxylic acid compound having 3 to 8 carbon atoms include an α,β-unsaturated carboxylic acid having 3 to 8 carbon atoms, and a metal salt of an α,β-unsaturated carboxylic acid having 3 to 8 carbon atoms.

The α,β-unsaturated carboxylic acid compound having 3 to 8 carbon atoms preferably has 3 to 6 carbon atoms, more preferably has 3 or 4 carbon atoms. Examples of the α,β-unsaturated carboxylic acid having 3 to 8 carbon atoms include acrylic acid, methacrylic acid, fumaric acid, maleic acid and crotonic acid. It is noted that the α,β-unsaturated carboxylic acid having 3 to 8 carbon atoms may be used solely, or at least two of them may be used in combination.

Examples of the metal ion constituting the metal salt of the α,β-unsaturated carboxylic acid having 3 to 8 carbon atoms include a monovalent metal ion such as sodium, potassium and lithium; a divalent metal ion such as magnesium, calcium, zinc, barium and cadmium; a trivalent metal ion such as aluminum, and other metal ion such as tin and zirconium.

(b13) The ligand derived from the mercaptobenzothiazole-based compound has a structure in which the hydrogen atom (the substituent group in the case that the hydrogen atom is replaced) of the mercapto group of the mercaptobenzothiazole-based compound is dissociated, or a structure in which the hydrogen atom (the substituent group in the case that the hydrogen atom is replaced) bonding to the nitrogen atom of the thiazole ring is dissociated. Examples of the mercaptobenzothiazole-based compound include 2-mercaptobenzothiazole, a metal salt of 2-mercaptobenzothiazole, 2-mercaptobenzothiazole having a substituent group, and a metal salt of 2-mercaptobenzothiazole having a substituent group.

(b13) The ligand derived from the mercaptobenzothiazole-based compound is preferably a ligand derived from at least one member selected from the group consisting of a compound represented by the formula (1), a metal salt of the compound represented by the formula (1), a compound represented by the formula (2), and a metal salt of the compound represented by the formula (2).

(1)

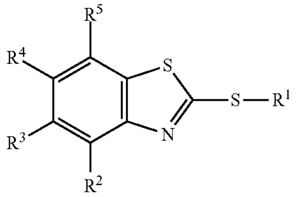

(2)

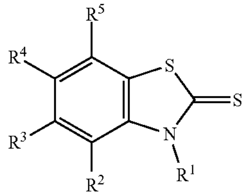

[In the formulae (1) and (2), $R^1$ represents a hydrogen atom, an alkyl group having 1 to 8 carbon atoms or an aryl group having 4 to 14 carbon atoms, and $R^2$ to $R^6$ are identical to or different from each other and represent an electron-withdrawing group or a hydrogen atom.]

Examples of the alkyl group having 1 to 8 carbon atoms represented by $R^1$ in the formula (1) or the formula (2) include a linear alkyl group, a branched alkyl group, and a cyclic alkyl group. The alkyl group preferably has 1 or more carbon atoms, and preferably has 6 or less carbon atoms, more preferably has 4 or less carbon atoms.

Examples of the linear alkyl group include a methyl group, an ethyl group, a n-propyl group, a n-butyl group, and a n-pentyl group.

Examples of the branched alkyl group include an isopropyl group, an isobutyl group, a s-butyl group, a t-butyl group, and an isopentyl group.

Examples of the cyclic alkyl group include a cyclopropyl group, a cyclobutyl group, a cyclopentyl group, and a cyclohexyl group.

The aryl group having 4 to 14 carbon atoms represented by $R^1$ preferably has 6 or more carbon atoms, and preferably has 12 or less carbon atoms, more preferably has 10 or less carbon atoms. Examples of the aryl group include a phenyl group, and a naphthyl group.

As $R^1$, the hydrogen atom or the alkyl group having 1 to 8 carbon atoms is preferable, the hydrogen atom is more preferable.

The electron-withdrawing group represented by $R^2$ to $R^5$ is a substituent group whose force withdrawing electron from the carbon atom which the substituent group is bonding is greater than that of a hydrogen atom. Examples of the electron-withdrawing group represented by $R^2$ to $R^5$ include a halogen group, a perfluoroalkyl group, a halogenated alkyl group, an alkylcarbonyl group, an alkoxycarbonyl group, a pentafluorosulfanyl group ($—SF_6$), a nitro group ($—NO_2$), a cyano group (—CN), a carboxy group (—COOH), an aldehyde group (—CHO), a sulfanyl group (—SH), a sulfonic group ($—SO_3H$), an alkylsulfonyl group, an alkoxysulfonyl group, and a perfluoroalkylsulfonyl group.

Examples of the halogen group include a fluoro group (—F), a chloro group (—Cl), and a bromo group (—Br).

Examples of the perfluoroalkyl group include a trifluoromethyl group ($—CF_3$), a pentafluoroethyl group ($—C_2F_5$), and a heptafluoropropyl group ($—C_3Fr$).

Examples of the halogenated alkyl group include a trichloromethyl group ($—CCl_3$), and a monochloromethyl group ($—CH_2C$).

Examples of the alkylcarbonyl group include an acetyl group (—COCHs), and a propionyl group ($—COC_2H_5$).

Examples of the alkoxycarbonyl group include a methoxycarbonyl group ($—COOCH_3$), and an ethoxycarbonyl group ($—COOC_2H_5$).

Examples of the alkylsulfonyl group include a methylsulfonyl group ($—SO_2CH_5$), and an ethylsulfonyl group ($—SO_2C_2H_5$).

Examples of the alkoxysulfonyl group include a methoxysulfonyl group ($—SO_2OCH_5$), and an ethoxysulfonyl group ($—SO_2OC_2H_5$).

Examples of the perfluoroalkylsulfonyl group include a trifluoromethylsulfonyl group ($—SO_2CF_3$), and a pentafluoroethylsulfonyl group ($—SO_2C_2F_5$).

All $R^2$ to $R^5$ may be the hydrogen atom. Alternatively, it is also preferable that at least one of $R^2$ to $R^5$ is the electron-withdrawing group. The electron-withdrawing group represented by $R^2$ to $R^5$ preferably includes at least one member selected from the group consisting of the halogen group, the perfluoroalkyl group, and the pentafluorosulfanyl group.

(b13) The ligand derived from the mercaptobenzothiazole-based compound is preferably a ligand derived from at least one member selected from the group consisting of 2-mercaptobenzothiazole, 5-methyl-2-mercaptobenzothiazole, 5-fluoro-2-mercaptobenzothiazole, 5-chloro-2-mercaptobenzothiazole, 5-bromo-2-mercaptobenzothiazole, 5-trifluoromethyl-2-mercaptobenzothiazole, 5-nitro-2-mercaptobenzothiazole, 5-cyano-2-mercaptobenzothiazole, 5-carboxy-2-mercaptobenzothiazole, 5-sulfo-2-mercaptobenzothiazole, 5-sulfanyl-2-mercaptobenzothiazole, and 5-(trifluoromethyl)sulfonyl-2-mercaptobenzothiazole.

The molar ratio (b12/b13) of (b12) the ligand derived from the α,β-unsaturated carboxylic acid having 3 to 8 carbon atoms to (b13) the ligand derived from the mercaptobenzothiazole-based compound in (b1) the metal complex is preferably 1.0 or more, more preferably 1.5 or more, and even more preferably 2.0 or more, and is preferably 6.0 or less, more preferably 5.5 or less, and even more preferably 5.0 or less. If the molar ratio (b12/b13) is 1.0 or more, the member formed from the rubber composition has an appropriate hardness and the crosslinked rubber molded product has further enhanced resilience, and if the molar ratio (b12/b13) is 6.0 or less, excessively great hardness of the member formed from the rubber composition is suppressed.

The amount of (b1) the metal complex in the rubber composition is preferably 0.1 part by mass or more, more preferably 0.5 part by mass or more, and even more preferably 1.0 part by mass or more, and is preferably 25 parts by mass or less, more preferably 20 parts by mass or less, and even more preferably 18 parts by mass or less, with respect to 100 parts by mass of (a) the base rubber. If the amount of (b1) the metal complex is 0.1 part by mass or more, the member formed from the rubber composition has an appropriate hardness and the crosslinked rubber molded product has further enhanced resilience, and if the amount of (b1) the metal complex is 25 parts by mass or less, excessively great hardness of the member formed from the rubber composition is suppressed.

(b) The co-crosslinking agent may further include other co-crosslinking agents than (b1) the metal complex as long as the other co-crosslinking agents do not impair the effect of the present disclosure. Examples of the other co-crosslinking agents include an α,β-unsaturated carboxylic acid having 3 to 8 carbon atoms and/or a metal salt thereof. The α,β-unsaturated carboxylic acid having 3 to 8 carbon atoms and/or the metal salt thereof has an action of crosslinking a rubber molecule by graft polymerization to a base rubber molecular chain. Examples of the α,β-unsaturated carboxylic acid having 3 to 8 carbon atoms include acrylic acid, methacrylic acid, fumaric acid, maleic acid and crotonic acid.

Examples of the metal ion constituting the metal salt of the α,β-unsaturated carboxylic acid having 3 to 8 carbon atoms include a monovalent metal ion such as sodium, potassium and lithium; a divalent metal ion such as magnesium, calcium, zinc, barium and cadmium; a trivalent metal ion such as aluminum; and other metal ions such as tin and zirconium. The above metal component may be used solely or as a mixture of at least two of them. Among them, the divalent metal ion such as magnesium, calcium, zinc, barium or cadmium is preferably used as the metal component. This is because if the divalent metal salt of the α,β-unsaturated carboxylic acid having 3 to 8 carbon atoms is used, a metal crosslinking easily generates between the rubber molecules.

In the case of using the other co-crosslinking agents, the amount of (b1) the metal complex in (b) the co-crosslinking agent is preferably 1.0 mass % or more, more preferably 1.5 mass % or more, and even more preferably 2.0 mass % or more, and is preferably 70 mass % or less, more preferably 65 mass % or less, and even more preferably 60 mass % or less. If the amount of (b1) the metal complex in (b) the co-crosslinking agent is 1.0 mass % or more, the member formed from the rubber composition has an appropriate hardness and the crosslinked rubber molded product has further enhanced resilience; and if the amount of (b1) the metal complex in (b) the co-crosslinking agent is 70 mass % or less, excessively great hardness of the member formed from the rubber composition is suppressed.

The amount of (b) the co-crosslinking agent in the rubber composition is preferably 1 part by mass or more, more preferably 3 parts by mass or more, and even more preferably 5 parts by mass or more, and is preferably 50 parts by mass or less, more preferably 45 parts by mass or less, and even more preferably 40 parts by mass or less, with respect to 100 parts by mass of (a) the base rubber. If the amount of (b) the co-crosslinking agent is 1 part by mass or more, the member formed from the rubber composition has an appropriate hardness and the crosslinked rubber molded product has further enhanced resilience, and if the amount of (b) the co-crosslinking agent is 50 parts by mass or less, excessively great hardness of the member formed from the rubber composition is suppressed.

((c) Crosslinking Initiator).

(c) The crosslinking initiator is blended to crosslink (a) the base rubber component. As (c) the crosslinking initiator, an organic peroxide is suitable. Examples of the organic peroxide include a peroxy ketal, a dialkyl peroxide, a diacyl peroxide, and a peroxy ester. Examples of the peroxy ketal include 1,1-di(t-hexylperoxy)cyclohexane, 1,1-di(t-butylperoxy)cyclohexane, n-butyl4,4-di-(t-butylperoxyvalerate), and 1,1-bis(t-butylperoxy)-3,3,5-trimethylcyclohexane. Examples of the dialkyl peroxide include dicumyl peroxide, di(2-t-butylperoxyisopropyl)benzene, t-butylcumyl peroxide, 2,5-dimethyl-2,5-di(t-butylperoxy)hexane, 2,5-dimethyl-2,5-di(t-butylperoxy)hexyne-3, and di-t-butyl peroxide. Examples of the peroxy ester include 2,5-dimethyl-2,5-di(benzoylperoxy)hexane, t-hexylperoxy benzoate, and t-butylperoxy benzoate. These organic peroxides may be used solely, or at least two of them may be used in combination. Among them, dicumyl peroxide is preferably used.

The amount of (c) the crosslinking initiator is preferably 0.2 part by mass or more, more preferably 0.5 part by mass or more, and even more preferably 0.7 part by mass or more; and is preferably 5.0 parts by mass or less, more preferably 2.5 parts by mass or less, and even more preferably 2.0 parts by mass or less, with respect to 100 parts by mass of (a) the base rubber. If the amount of (c) the crosslinking initiator is 0.2 part by mass or more, the crosslinked rubber molded product formed from the rubber composition is not excessively soft, and thus the resilience is better, and if the amount of (c) the crosslinking initiator is 5.0 parts by mass or less, the crosslinked rubber molded product formed from the rubber composition has an appropriate hardness; and thus the resilience and the durability are better.

((d) Metal Compound).

The rubber composition may further contain (d) a metal compound. Examples of (d) the metal compound include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate; and potassium carbonate. (d) The metal compound may be used solely, or two or more of them may be used in combination. As (d) the metal compound, the metal oxide is preferable, at least one member selected from the group consisting of magnesium oxide, calcium oxide, and zinc oxide is more preferable.

The amount of (d) the metal compound in the rubber composition is preferably 0.5 part by mass or more, more preferably 1.0 part by mass or more, and even more preferably 1.5 parts by mass or more, and is preferably 20 parts by mass or less, more preferably 15 parts by mass or less, and even more preferably 10 parts by mass or less, with respect to 100 parts by mass of (a) the base rubber.

((e) Carboxylic Acid and/or Salt Thereof).

The rubber composition may further contain (e) a carboxylic acid and/or a salt thereof. If the rubber composition contains (e) the carboxylic acid and/or the salt thereof, the hardness distribution of the obtained crosslinked rubber molded product can be controlled. Examples of (e) the carboxylic acid and/or the salt thereof include an aliphatic carboxylic acid, an aliphatic carboxylic acid salt, an aromatic carboxylic acid and an aromatic carboxylic acid salt. (e) The carboxylic acid and/or the salt thereof may be used solely, or as a mixture of two or more of them it is noted that (e) the carboxylic acid and/or the salt thereof excludes (b1) the metal complex, and the α,β-unsaturated carboxylic acid having 3 to 8 carbon atoms and the metal salt thereof used as (b) the co-crosslinking agent.

The aliphatic carboxylic acid may be either a saturated aliphatic carboxylic acid (hereinafter sometimes referred to as "saturated fatty acid") or an unsaturated aliphatic carboxylic acid (hereinafter sometimes referred to as "unsaturated fatty acid"). In addition, the aliphatic carboxylic acid may have a branched or cyclic structure. The saturated fatty acid preferably has 6 or more carbon atoms, more preferably has 7 or more carbon atoms, and even more preferably has 8 or more carbon atoms, and preferably has 24 or less carbon atoms, more preferably has 18 or less carbon atoms, and even more preferably has 13 or less carbon atoms. The unsaturated fatty acid preferably has 6 or more carbon atoms, more preferably has 7 or more carbon atoms; and even more preferably has 8 or more carbon atoms, and preferably has 24 or less carbon atoms, more preferably has 18 or less carbon atoms, and even more preferably has 13 or less carbon atoms.

Examples of the aromatic carboxylic acid include a carboxylic acid having a benzene ring in the molecule, and a carboxylic acid having an aromatic heterocycle in the molecule. The aromatic carboxylic acid may be used solely, or two or more of them may be used in combination Examples of the carboxylic acid having the benzene ring include an aromatic carboxylic acid having a carboxyl group directly bonding to a benzene ring, an aromatic-aliphatic carboxylic acid having an aliphatic carboxylic acid bonding to a benzene ring, a polynuclear aromatic carboxylic acid having a carboxyl group directly bonding to a fused benzene ring, and a polynuclear aromatic-aliphatic carboxylic acid having an aliphatic carboxylic acid bonding to a fused benzene ring. Examples of the carboxylic acid having the aromatic heterocycle include a carboxylic acid having a carboxyl group directly bonding to an aromatic heterocycle.

As the aliphatic carboxylic acid salt or aromatic carboxylic acid salt, a salt of the above mentioned aliphatic carboxylic acid or aromatic carboxylic acid can be used. Examples of the cation component of these salts include a metal ion, an ammonium ion, and an organic cation. The cation component may be used solely, or two or more of them may be used in combination. Examples of the metal ion include a monovalent metal ion such as sodium, potassium, lithium and silver; a divalent metal ion such as magnesium, calcium, zinc, barium, cadmium, copper, cobalt, nickel and manganese; a trivalent metal ion such as aluminum and iron: other ion such as tin, zirconium and titanium. Among them, the metal ion is preferably the divalent metal ion, more preferably magnesium, zinc, or calcium.

The organic cation is a cation having a carbon chain. The organic cation is not particularly limited, and examples thereof include an organic ammonium ion. Examples of the organic ammonium ion include a primary ammonium ion such as a stearyl ammonium ion, a hexyl ammonium ion, an octyl ammonium ion and a 2-ethylhexyl ammonium ion: a secondary ammonium ion such as a dodecyl(lauryl) ammonium ion and an octadecyl(stearyl) ammonium ion; a tertiary ammonium ion such as a trioctyl ammonium ion; and a quaternary ammonium ion such as a dioctyldimethyl ammonium ion and a distearyldimethyl ammonium ion. These organic cations may be used solely, or two or more of them may be used in combination.

Examples of the aliphatic carboxylic acid and/or the salt thereof include a saturated fatty acid and/or a salt thereof; and an unsaturated fatty acid and/or a salt thereof. The saturated fatty acid and/or the salt thereof is preferable, and caprylic acid (octanoic acid), pelargonic acid (nonanoic acid), capric acid (decanoic acid), lauric acid, myristic acid, palmitic acid, stearic acid, behenic acid, and their potassium salt, magnesium salt, calcium salt, aluminum salt, zinc salt, iron salt, copper salt, nickel salt and cobalt salt, are preferable. As the unsaturated fatty acid and/or the salt thereof, palmitoleic acid, oleic acid, linoleic acid, arachidonic acid, and their potassium salt, magnesium salt, calcium salt, aluminum salt, zinc salt, iron salt, copper salt, nickel salt and cobalt salt, are preferable.

As the aromatic carboxylic acid and/or the salt thereof, benzoic acid, butylbenzoic acid, anisic acid (methoxybenzoic acid), dimethoxybenzoic acid, trimethoxybenzoic acid: dimethylaminobenzoic acid, chlorobenzoic acid, dichlorobenzoic acid, trichlorobenzoic acid, acetoxybenzoic acid, biphenylcarboxylic acid, naphthalenecarboxylic acid, anthracenecarboxylic acid, furancarboxylic acid, thionic acid, and their potassium salt, magnesium salt, calcium salt, aluminum salt, zinc salt, iron salt, copper salt, nickel salt and cobalt salt, are particularly preferable.

For example, the amount of (e) the carboxylic acid and/or the salt thereof is preferably 1 part by mass or more, more preferably 2 parts by mass or more; and even more preferably 3 parts by mass or more, and is preferably 30 parts by mass or less, more preferably 20 parts by mass or less, and even more preferably 15 parts by mass or less, with respect to 100 parts by mass of (a) the base rubber.

((f) Organic Sulfur Compound).

The rubber composition may further contain (f) an organic sulfur compound. Examples of (f) the organic sulfur compound include at least one member selected from the group consisting of thiophenols, thionaphthols, polysulfides, thiurams, thiocarboxylic acids, dithiocarboxylic acids, sulfenamides, dithiocarbamates, thiazoles, and metal salts thereof. As (f) the organic sulfur compound, the organic sulfur compound having a thiol group (—SH), or the metal salt thereof is preferable, thiophenols, thionaphthols, or the metal salt thereof are more preferable.

Examples of the thiols include thiophenols and thionaphthols. Examples of the thiophenols include thiophenol; thiophenols substituted with a fluoro group, such as 4-fluorothiophenol, 2,5-difluorothiophenol, 2,6-difluorothiophenol, 2,4,5-trifluorothiophenol, 2,4,5,6-tetrafluorothiophenol and pentafluorothiophenol; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol and pentachlorothiophenol; thiophenols substituted with a bromo group, such as 4-bromothiophenol, 2,5-dibromothiophenol, 2,6-dibromothiophenol, 2,4,5-tribromothiophenol, 2,4,5,6-tetrabromothiophenol and pentabromothiophenol; thiophenols substituted with an iodo group, such as 4-iodothiophenol, 2,5-diiodothiophenol, 2,6-diiodothiophenol, 2,4,5-triiodothiophenol, 2,4,5,6-tetraiodothiophenol and pentaiodothiophenol; and metal salts thereof. As the metal salt, zinc salt is preferable.

Examples of the thionaphthols (naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and metal salts thereof. Among them, 2-thionaphthol, 1-thionaphthol, and metal salts thereof are preferable. As the metal salt, a divalent metal salt is preferable, zinc salt is more preferable Specific examples of the metal salt include zinc salt of 1-thionaphthol and zinc salt of 2-thionaphthol.

The polysulfides are organic sulfur compounds having a polysulfide bond, and examples thereof include disulfides, trisulfides, and tetrasulfides. As the polysulfides, diphenyl polysulfides are preferable.

Examples of the diphenyl polysulfides include diphenyl disulfide: diphenyl disulfides substituted with a halogen group, such as bis(4-fluorophenyl) disulfide, bis(2,5-difluorophenyl) disulfide, bis(2,6-difluorophenyl) disulfide, bis(2,4,5-trifluorophenyl) disulfide, bis(2,4,5,6-tetrafluorophenyl) disulfide, bis(pentafluorophenyl) disulfide, bis(4-chlorophenyl) disulfide, bis(2,5-dichlorophenyl) disulfide, bis(2,6-dichlorophenyl) disulfide, bis(2,4,5-trichlorophenyl) disulfide, bis(2,4,5,6-tetrachlorophenyl) disulfide, bis(pentachlorophenyl) disulfide, bis(4-bromophenyl) disulfide, bis(2,5-dibromophenyl) disulfide, bis(2,6-dibromophenyl) disulfide, bis(2,4,5-tribromophenyl) disulfide, bis(2,4,5,6-tetrabromophenyl) disulfide, bis(pentabromophenyl) disulfide, bis(4-iodophenyl) disulfide, bis(2,5-diiodophenyl) disulfide, bis(2,6-diiodophenyl) disulfide, bis(2,4,5-triiodophenyl) disulfide, bis(24,5,6-tetraiodophenyl) disulfide and bis(pentaiodophenyl) disulfide; and diphenyl disulfides substituted with an alkyl group, such as bis(4-methylphenyl) disulfide, bis(2,4,5-trimethylphenyl) disulfide, bis(pentamethylphenyl) disulfide, bis(4-t-butylphenyl) disulfide, bis(2,4,5-tri-t-butylphenyl) disulfide, and bis(penta-t-butylphenyl disulfide.

Examples of the thiurams include thiuram monosulfides such as tetramethylthiuram monosulfide; thiuram disulfides such as tetramethylthiuram disulfide, tetraethylthiuram disulfide and tetrabutylthiuram disulfide; and thiuram tetrasulfides such as dipentamethylenethiuram tetrasulfide. Examples of the thiocarboxylic acids include naphthalene thiocarboxylic acid. Examples of the dithiocarboxylic acids include naphthalene dithiocarboxylic acid. Examples of the sulfenamides include N-cyclohexyl-2-benzothiazole sulfenamide. N-oxydiethylene-2-benzothiazole sulfenamide, and N-t-butyl-2-benzothiazole sulfenamide.

(f) The organic sulfur compound may be used solely or as a mixture of at least two of them. As (f) the organic sulfur compound, the thiophenols and/or the metal salts thereof, the thionaphthols and/or the metal salts thereof, the diphenyl disulfides, and the thiuram disulfides are preferable, 2,4-dichlorothiophenol, 2,6-diftuorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyl disulfide, bis(2,6-difluorophenyl) disulfide, bis(2,6-dichlorophenyl) disulfide, bis(2,6-dibromophenyl) disulfide, bis(2,6-diiodophenyl) disulfide, and bis (pentabromophenyl) disulfide are more preferable.

The amount of (f) the organic sulfur compound is preferably 0.05 part by mass or more, more preferably 0.1 part by mass or more, and even more preferably 0.2 part by mass or more, and is preferably 5.0 parts by mass or less, more preferably 3.0 parts by mass or less, and even more preferably 2.0 parts by mass or less: with respect to 100 parts by mass of (a) the base rubber. If the amount of (f) the organic sulfur compound is 0.05 part by mass or more, the effect of adding (f) the organic sulfur compound is sufficiently obtained and the resilience of the golf ball is enhanced. In addition, if the amount of (f) the organic sulfur compound is 5.0 parts by mass or less, the obtained golf ball does not have an excessively great compression deformation amount and the resilience thereof is better.

Other Components

The rubber composition may contain additives such as a pigment, a filler for adjusting weight or the like: an antioxidant, a peptizing agent, and a softener, where necessary. In addition, the rubber composition may contain a rubber powder obtained by pulverizing a golf ball core or offcuts produced when preparing a core.

Examples of the pigment blended in the rubber composition include a white pigment, a blue pigment, and a purple pigment. As the white pigment, titanium oxide is preferably used. The type of titanium oxide is not particularly limited, but a rutile type of titanium oxide is preferably used because of its high opacity. In addition, the amount of titanium oxide is preferably 0.5 part by mass or more, more preferably 1 part by mass or more, and even more preferably 2 parts by mass or more, and is preferably 8 parts by mass or less, more preferably 7 parts by mass or less, and even more preferably 6 parts by mass or less: with respect to 100 parts by mass of (a) the base rubber.

It is also preferred that the rubber composition contains both the white pigment and the blue pigment. The blue pigment is blended in order to cause white color to be vivid, and examples thereof include ultramarine blue, cobalt blue, and phthalocyanine blue. In addition, examples of the purple pigment include anthraquinone violet, dioxazine violet, and methyl violet.

The filler blended in the rubber composition is mainly used as a weight adjusting agent for adjusting the weight of the obtained crosslinked rubber molded product. The filler may be blended where necessary. Examples of the filler include an inorganic filler such as zinc oxide, barium sulfate, calcium carbonate, magnesium oxide, tungsten powder, and molybdenum powder.

The amount of the filler is preferably 0.5 part by mass or more, more preferably 0.7 part by mass or more, and even more preferably 1 part by mass or more, and is preferably 30 parts by mass or less, more preferably 25 parts by mass or less; and even more preferably 20 parts by mass or less: with respect to 100 parts by mass of (a) the base rubber. If the amount of the filler is 0.5 part by mass or more, the weight adjusting becomes easier, and if the amount of the filler is 30 parts by mass or less, the weight proportion of the rubber component is not excessively low and the resilience is better.

The amount of the antioxidant is preferably 0.1 part by mass or more and 1 part by mass or less with respect to 100 parts by mass of (a) the base rubber. In addition, the amount of the peptizing agent is preferably 0.1 part by mass or more and 5 parts by mass or less with respect to 100 parts by mass of (a) the base rubber.

[Production Method of Rubber Composition]

(Preparation of (b1) the Metal Complex).

(b1) The metal complex can be obtained by contacting the raw material of the metal component, the α,β-unsaturated carboxylic acid compound having 3 to 8 carbon atoms, and the mercaptobenzothiazole compound. It is noted that, as the α,β-unsaturated carboxylic acid compound, a metal salt of a commercially available α,β-unsaturated carboxylic acid compound can be used. In addition, as the mercaptobenzothiazole compound, a metal salt of a commercially available mercaptobenzothiazole or a metal salt of a mercaptobenzothiazole having a substituent group can be used.

Examples of the method for producing (b1) the metal complex include a method of mixing the raw material of the metal component: the α,β-unsaturated carboxylic acid having 3 to 8 carbon atoms and the mercaptobenzothiazole-based compound (mercaptobenzothiazole or mercaptobenzothiazole having a substituent group) all together at the same time; a method of mixing the raw material of the metal component and the α,β-unsaturated carboxylic acid having 3 to 8 carbon atoms to prepare a metal salt of the α,β-unsaturated carboxylic acid having 3 to 8 carbon atoms followed by mixing the obtained metal salt and the mercaptobenzothiazole-based compound; and a method of mixing the raw material of the metal component and the mercaptobenzothiazole-based compound to prepare a metal salt of the mercaptobenzothiazole-based compound followed by mixing the obtained metal salt and the α,β-unsaturated carboxylic acid having 3 to 8 carbon atoms.

Specific examples of the method for producing (b1) the metal complex include a production method comprising a step of dissolving or dispersing the metal salt of the α,β-unsaturated carboxylic acid having 3 to 8 carbon atoms and the mercaptobenzothiazole-based compound in a solvent and heating the resultant mixture while stirring (reaction step); and a step of removing the solvent from the reaction liquid (drying step).

In the reaction step, the metal salt of the α,β-unsaturated carboxylic acid compound having 3 to 8 carbon atoms and the mercaptobenzothiazole-based compound are dissolved or dispersed in a solvent, and the resultant mixture is heated while stirring. In this step, the metal salt of the α,β-unsaturated carboxylic acid compound having 3 to 8 carbon atoms and the mercaptobenzothiazole-based compound react in the solvent to generate (b1) the metal complex.

The solvent is not particularly limited, and a solvent capable of dissolving (d1) the metal complex generated by the reaction can be used. Examples of the solvent include trichloromethane, dichloromethane, and chloroform. The amount of the solvent is preferably 1000 parts by mass or more, more preferably 2000 parts by mass or more, and even more preferably 3000 parts by mass or more, and is preferably 10000 parts by mass or less, more preferably 8000 parts by mass or less, and even more preferably 6000 parts by mass or less, with respect to 100 parts by mass of the total amount of the metal salt of the α,β-unsaturated carboxylic acid compound having 3 to 8 carbon atoms and the mercaptobenzothiazole-based compound.

It is noted that the solvent is preferably refluxed during the reaction. The liquid temperature in the reaction step is not particularly limited as long as the liquid temperature is a temperature at which the solvent can be refluxed. The reaction time in the reaction step is preferably 1 hour or more, more preferably 1.5 hours or more.

In the drying step, the solvent is removed from the reaction liquid. (di) The metal complex is obtained by removing the solvent. Examples of the method for removing the solvent include drying under reduced pressure and drying under heat, and the drying under reduced pressure is preferable. The reaction liquid can be heated when performing the drying under reduced pressure. The temperature of the reaction liquid when performing the drying is preferably 100° C. or less, more preferably 80° C. or less, and even more preferably 60° C. or less.

(Preparation of Masterbatch)

(b1) The metal complex may be formed into a masterbatch to prevent aggregation in the preparation of the rubber composition. The masterbatch can be prepared by mixing (b1) the metal complex and a part of (a) the base rubber.

In addition, in order to further enhance the dispersibility of (b1) the metal complex. (b1) the metal complex is preferably mixed with (a) the base rubber swollen with a first solvent. In this case, as the first solvent, a solvent capable of swelling (a) the base rubber and dissolving (b1) the metal complex is preferable. The amount of the first solvent is preferably 1000 parts by mass or more, more preferably 2000 parts by mass or more, and even more preferably 3000 parts by mass or more, and is preferably 10000 parts by mass or less, more preferably 8000 parts by mass or less, and even more preferably 6000 parts by mass or less, with respect to 100 parts by mass of (a) the base rubber.

In addition, in order to enhance the dispersibility of (b1) the metal complex even further, a solution obtained by dissolving (b1) the metal complex in a second solvent is preferably added in (a) the base rubber. In this case, as the second solvent, a solvent capable of dissolving (b1) the metal complex can be used. In addition, the first solvent and the second solvent are preferably the same solvent. The amount of the second solvent is preferably 100 parts by mass or more, more preferably 200 parts by mass or more, and even more preferably 300 parts by mass or more, and is preferably 1000 parts by mass or less, more preferably 800 parts by mass or less, and even more preferably 600 parts by mass or less, with respect to 100 parts by mass of (b1) the metal complex. It is noted that the reaction liquid after the reaction step and before the drying step in the above preparation of (b1) the metal complex may be concentrated and used in the preparation of the masterbatch.

(Preparation of Rubber Composition)

The rubber composition can be obtained by mixing and kneading (a) the base rubber, (b) the co-crosslinking agent, (c) the crosslinking initiator, and optionally (d) the metal compound. (e) the carboxylic acid and/or the salt thereof. (f) the organic sulfur compound and other additives added where necessary. (b) The co-crosslinking agent may be formed into a masterbatch with a part of (a) the base rubber in advance. The kneading method is not particularly limited. For example, the kneading can be conducted by using a conventional kneading machine such as a kneading roll, a banbury mixer, and a kneader.

[Crosslinked Rubber Molded Product]

The crosslinked rubber molded product according to the present disclosure is formed from the above-described rubber composition. The crosslinked rubber molded product can be obtained by molding the kneaded rubber composition in a mold. The molding temperature is preferably 120° C. or more, more preferably 150° C. or more, and is preferably 250° C. or less. In addition, the molding pressure preferably ranges 2.9 MPa to 11.8 MPa. The molding time preferably ranges from 10 minutes to 60 minutes.

Examples of the crosslinked rubber molded product include a sports goods such as a golf ball, a tennis ball and a grip; an industrial goods such as a hose, a belt, and a mat; a sole, a tire, a resin additive, an anti-vibration rubber, and a fender. Examples of the golf ball include a golf ball comprising a constituent member formed from the above-described rubber composition.

EXAMPLES

Next, the present disclosure will be described in detail by way of examples. However, the present disclosure is not limited to the examples described below. Various changes and modifications without departing from the spirit of the present disclosure are included in the scope of the present disclosure.

[Evaluation Method]

(1) Compression Deformation Amount (Mm)

The deformation amount of the spherical molded product along the compression direction (shrinking amount of the spherical molded product along the compression direction), when applying a load from 98 N as an initial load to 1275 N as a final load to the spherical molded product, was measured.

(2) Coefficient of Restitution

A metal cylindrical object with a mass of 198.4 g was allowed to collide with each spherical molded product at a speed of 40 m/sec, and the speeds of the cylindrical object and the spherical molded product before and after the collision were measured. Based on the speed and the mass of each object, the coefficient of restitution of each spherical molded product was calculated. The measurement was conducted by using twelve samples for each spherical molded product, and the average value thereof was adopted as the coefficient of restitution of the spherical molded product. It is noted that the coefficient of restitution of each core is shown as a difference from the coefficient of restitution of Core No. 5 (difference of coefficient of restitution=coefficient of restitution of each core−coefficient of restitution of Core No. 5).

[Preparation of Metal Complex]

(1) Metal Complex 1

In a flask, 30 g (0.18 mol) of mercaptobenzothiazole and 90 g of zinc acrylate (ZN-DA90S, a product including 10 mass % of zinc stearate, available from Nisshoku Techno Fine Chemical Co., Ltd.) were weighed, and 2.7 L of $CHCl_3$ was added as a solvent to prepare a reaction liquid. The reaction liquid was heated to 60° C. with an oil bath, and refluxed for 1.5 hours. The reaction liquid was cooled, and the solvent was removed therefrom by distillation. The obtained precipitate was pulverized, and dried under vacuum to obtain a metal complex 1. The obtained metal complex 1 is (b1) the metal complex in which the molar ratio (b12/b13) of (b12) the ligand derived from the α,β-unsaturated carboxylic acid having 3 to 8 carbon atoms to (b13) the ligand derived from the mercaptobenzothiazole-based compound is 4.43.

(2) Metal Complex 2

In a flask, 36.2 g (0.18 mol) of 5-chloro-mercaptobenzothiazole and 90 g of zinc acrylate (ZN-DA90S, a product including 10 mass % of zinc stearate, available from Nisshoku Techno Fine Chemical Co., Ltd.) were weighed, and 2.7 L of $CHCl_3$ was added as a solvent to prepare a reaction liquid. The reaction liquid was heated to 60° C. with an oil bath, and refluxed for 1.5 hours. The reaction liquid was cooled, and the solvent was removed therefrom by distillation. The obtained precipitate was pulverized, and dried under vacuum to obtain a metal complex 2. The obtained metal complex 2 is (b1) the metal complex in which the molar ratio (b12/b13) of (b12) the ligand derived from the α,β-unsaturated carboxylic acid having 3 to 8 carbon atoms to (b13) the ligand derived from the mercaptobenzothiazole-based compound is 4.43.

[Preparation of Masterbatch]

(1) Masterbatch Containing Metal Complex 1 and Butadiene Rubber

The butadiene rubber (BR730) 180 g was mixed with a solvent ($CH_2Cl_2$) 600 mL and placed for at least 3 days to allow the butadiene rubber to be swollen. Then, in a flask, 30 g (0.18 mol) of mercaptobenzothiazole and 90 g of zinc acrylate (ZN-DA90S, a product including 10 mass % of zinc stearate, available from Nisshoku Techno Fine Chemical Co., Ltd.) were weighed, and 2.7 L of $CH_2Cl_2$ was added as a solvent to prepare a reaction liquid. The reaction liquid was heated to 60° C. with an oil bath, and refluxed for 1.5 hours. The reaction liquid was cooled, and a part of the solvent (1.8 L to 2.2 L) was removed therefrom by distillation. The concentrated reaction liquid was added in the swollen butadiene rubber and mixed. The solvent was removed from the mixture by distillation, and the obtained product was dried under vacuum to obtain a masterbatch containing the metal complex 1 and the butadiene rubber. It is noted that the metal complex 1 is (b1) the metal complex in which the molar ratio (b12/b13) of (b12) the ligand derived from the α,β-unsaturated carboxylic acid having 3 to 8 carbon atoms to (b13) the ligand derived from the mercaptobenzothiazole-based compound is 4.43.

(1) Masterbatch Containing Metal Complex 2 and Butadiene Rubber

The butadiene rubber (BR730) 180 g was mixed with a solvent ($CH_2Cl_2$) 600 mL and placed for at least 3 days to allow the butadiene rubber to be swollen. Then, in a flask, 36.2 g (0.18 mol) of 5-chloro-mercaptobenzothiazole and 90 g of zinc acrylate (ZN-DA90S, a product including 10 mass % of zinc stearate, available from Nisshoku Techno Fine Chemical Co., Ltd.) were weighed, and 2.7 L of $CH_2Cl_2$ was added as a solvent to prepare a reaction liquid. The reaction liquid was heated to 60° C. with an oil bath, and refluxed for 1.5 hours. The reaction liquid was cooled, and a part of the solvent (1.8 L to 2.2 L) was removed therefrom by distillation. The concentrated reaction liquid was added in the swollen butadiene rubber and mixed. The solvent was removed from the mixture by distillation, and the obtained product was dried under vacuum to obtain a masterbatch containing the metal complex 2 and the butadiene rubber. It is noted that the metal complex 2 is (b1) the metal complex in which the molar ratio (b12/b13) of (b12) the ligand derived from the α,β-unsaturated carboxylic acid having 3 to 8 carbon atoms to (b13) the ligand derived from the mercaptobenzothiazole-based compound is 4.43.

[Production of Spherical Molded Product]

The rubber compositions having the formulations shown in Table 1 were kneaded with a kneading roll, and heat pressed at a temperature of 170° C. for 20 minutes in upper and lower molds, each having a hemispherical cavity, to obtain spherical molded products having a diameter of 40.86 mm

TABLE 1

| | | | Spherical molded product No. | | | | | | |
|---|---|---|---|---|---|---|---|---|---|
| | | | 1 | 2 | 3 | 4 | 5 | 6 | 7 |
| Formulation of rubber composition (parts by mass) | (a) Base rubber | BR730 | 100 | 94 | 100 | 94 | 100 | 100 | 100 |
| | (b) Co-crosslinking agent | ZN-DA90S | 23.5 | 23.5 | 23.5 | 25 | 28 | 25 | 26.5 |
| | | Metal complex 1 | 4 | — | — | — | — | — | — |
| | | Metal complex 2 | — | — | 4.21 | — | — | — | — |
| | | MBT | — | — | — | — | — | 1 | — |
| | | 5CI-MBT | — | — | — | — | — | — | 1.21 |
| | (a + b) Masterbatch | BR730 | — | 6 | — | 6 | — | — | — |
| | | Metal complex 1 | — | 4 | — | — | — | — | — |
| | | Metal complex 2 | — | — | — | 4.21 | — | — | — |
| | (c) Crosslinking initiator | DCP | 0.8 | 0.8 | 0.8 | 0.8 | 0.8 | 0.8 | 0.8 |
| | (e) Metal oxide | Zinc oxide | 5 | 5 | 5 | 5 | 5 | 5 | 5 |
| | (f) Organic sulfur compound | PCTP-Zn | 0.5 | 0.5 | 0.5 | 0.5 | 0.5 | 0.5 | 0.5 |
| Total amount of (b) co-crosslinking agent (parts by mass) with respect to 100 parts by mass of (a) base rubber | | | 25.2 | 25.2 | 25.4 | 26.7 | 25.2 | 22.5 | 23.9 |
| Amount of (b1) metal complex (mass %) in (b) co-crosslinking agent | | | 15.9 | 15.9 | 16.6 | 15.8 | — | — | — |
| Molar ratio (b12/b13) in (b1) metal complex | | | 4.43 | 4.43 | 4.43 | 4.43 | — | — | — |
| Evaluation | Coefficient of restitution | | 0.004 | 0.004 | 0.004 | 0.005 | — | 0.003 | 0.002 |
| | Compression deformation amount (mm) | | 3.8 | 3.9 | 3.8 | 3.7 | 3.8 | 3.8 | 3.8 |

BR: "BR730" (high-cis polybutadiene rubber (cis-1.4 bond content=96 mass %, 1,2-vinyl bond content=1.3 mass %, Moony viscosity ($ML_{1+4}$(100° C.)=55, molecular weight distribution (Mw/Mn)=3)) available from JSR Corporation.

ZN-DA90S: zinc acrylate (including 10 mass % of zinc stearate) available from Nisshoku Techno Fine Chemical Co., Ltd.

MBT 2-mercaptobenzothiazole (NOCCELER M-P) available from Ouchi Shinko Chemical Industrial Co., Ltd.

5Cl-MBT-5-chloro-2-mercaptobenzothiazole available from Tokyo Chemical Industry Co., Ltd.

DCP "Percumyl (register trademark) D" (dicumyl peroxide) available from NOF Corporation Zn oxide: "Ginrei R" available from Toho Zinc Co., Ltd.

PCTP-Zn: zinc pentachlorothiophenol available from FUJIFILM Wako Chemicals Corporation The spherical molded products No. 1 to 4 are formed from a rubber composition containing (b1) the metal complex as the co-crosslinking agent. The spherical molded product No. 5 is formed from a rubber composition containing only zinc acrylate as the co-crosslinking agent. The spherical molded products No. 6 and No 7 are formed from a rubber composition containing zinc acrylate and the benzothiazole-based compound as the co-crosslinking agent.

As shown in Table 1, the spherical molded products No. 1 to 4 have more excellent resilience performance than the spherical molded products No. 5 to 7.

The present disclosure (1) is a rubber composition containing (a) a base rubber. (b) a co-crosslinking agent; and (c) a crosslinking initiator, wherein (b) the co-crosslinking agent includes (b1) a metal complex, and (b1) the metal complex is composed of (b11) a metal component, (b12) a ligand derived from an α,β-unsaturated carboxylic acid compound having 3 to 8 carbon atoms, and (b13) a ligand derived from a mercaptobenzothiazole-based compound.

The present disclosure (2) is the rubber composition according to the present disclosure (1), wherein (b13) the ligand derived from the mercaptobenzothiazole-based compound includes a ligand derived from at least one member selected from the group consisting of a compound represented by the formula (1), a metal salt of the compound represented by the formula (1), a compound represented by the formula (2), and a metal salt of the compound represented by the formula (2).

(1)

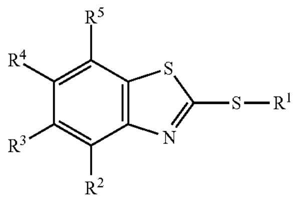

(2)

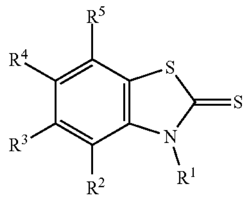

[In the formulae (1) and (2), $R^1$ represents a hydrogen atom, an alkyl group having 1 to 8 carbon atoms or an aryl group having 4 to 14 carbon atoms, and $R^2$ to $R^5$ are identical to or different from each other and represent an electron-withdrawing group or a hydrogen atom.]

The present disclosure (3) is the rubber composition according to the present disclosure (2), wherein at least one electron-withdrawing group represented by $R^7$ to $R^5$ includes at least one member selected from the group consisting of a halogen group, a perfluoroalkyl group; and a pentafluorosulfanyl group.

The present disclosure (4) is the rubber composition according to any one of the present disclosures (1) to (3), wherein a molar ratio (b12/b13) of (b12) the ligand derived from the α,β-unsaturated carboxylic acid compound having 3 to 8 carbon atoms to (b13) the ligand derived from the mercaptobenzothiazole-based compound in (b1) the metal complex ranges from 1.0 to 6.0.

The present disclosure (5) is the rubber composition according to any one of the present disclosures (1) to (4), wherein an amount of (b1) the metal complex ranges from 1.0 mass % to 70 mass % in 100 mass % of (b) the co-crosslinking agent.

The present disclosure (6) is the rubber composition according to any one of the present disclosures (1) to (5), wherein the rubber composition further contains (f) an organic sulfur compound.

The present disclosure (7) is a crosslinked rubber molded product formed from the rubber composition according to any one of the present disclosures (1) to (6).

The present disclosure (8) is a golf ball comprising a constituent member formed from the rubber composition according to any one of the present disclosures (1) to (6).

If the rubber composition according to the present disclosure is used, a crosslinked rubber molded product having excellent resilience performance is obtained. Thus, the rubber composition according to the present disclosure can be used for a sports goods such as a golf ball, a tennis ball and a grip; an industrial goods such as a hose, a belt, and a mat; a sole, a tire, a resin additive, an anti-vibration rubber, and a fender, and so on.

This application is based on Japanese patent application No. 2022-162375 filed on Oct. 7, 2022, the content of which is hereby incorporated by reference.

The invention claimed is:

1. A rubber composition containing (a) a base rubber, (b) a co-crosslinking agent, and (c) a crosslinking initiator, wherein (b) the co-crosslinking agent includes (b1) a metal complex, and (b1) the metal complex is composed of (b11) a metal component, (b12) a ligand derived from an α,β-unsaturated carboxylic acid compound having 3 to 8 carbon atoms, and (b13) a ligand derived from a mercaptobenzothiazole-based compound.

2. The rubber composition according to claim 1, wherein (b13) the ligand derived from the mercaptobenzothiazole-based compound includes a ligand derived from at least one member selected from the group consisting of a compound represented by the formula (1), a metal salt of the compound represented by the formula (1), a compound represented by the formula (2), and a metal salt of the compound represented by the formula (2),

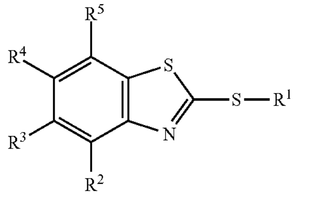

(1)

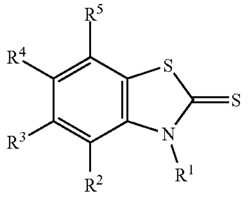

(2)

wherein in the formulae (1) and (2), $R^1$ represents a hydrogen atom, an alkyl group having 1 to 8 carbon atoms or an aryl group having 4 to 14 carbon atoms, and $R^2$ to $R^5$ are identical to or different from each other and represent an electron-withdrawing group or a hydrogen atom.

3. The rubber composition according to claim 2, wherein at least one electron-withdrawing group represented by $R^2$ to $R^5$ includes at least one member selected from the group consisting of a halogen group, a perfluoroalkyl group, and a pentafluorosulfanyl group.

4. The rubber composition according to claim 1, wherein a molar ratio (b12/b13) of (b12) the ligand derived from the α,β-unsaturated carboxylic acid compound having 3 to 8 carbon atoms to (b13) the ligand derived from the mercaptobenzothiazole-based compound in (b1) the metal complex ranges from 1.0 to 6.0.

5. The rubber composition according to claim 1, wherein an amount of (b1) the metal complex ranges from 1.0 mass % to 70 mass % in 100 mass % of (b) the co-crosslinking agent.

6. The rubber composition according to claim 1, wherein the rubber composition further contains (f) an organic sulfur compound.

7. A crosslinked rubber molded product formed from a rubber composition containing (a) a base rubber, (b) a co-crosslinking agent, and (c) a crosslinking initiator, wherein (b) the co-crosslinking agent includes (b1) a metal complex, and (b1) the metal complex is composed of (b11) a metal component, (b12) a ligand derived from an α,β-unsaturated carboxylic acid compound having 3 to 8 carbon atoms, and (b13) a ligand derived from a mercaptobenzothiazole-based compound.

8. The crosslinked rubber molded product according to claim 7, wherein (b13) the ligand derived from the mercaptobenzothiazole-based compound includes a ligand derived from at least one member selected from the group consisting of a compound represented by the formula (1), a metal salt of the compound represented by the formula (1), a compound represented by the formula (2), and a metal salt of the compound represented by the formula (2),

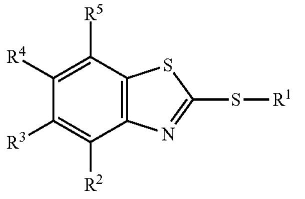

(1)

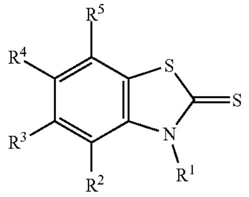

(2)

wherein in the formulae (1) and (2), $R^1$ represents a hydrogen atom, an alkyl group having 1 to 8 carbon atoms or an aryl group having 4 to 14 carbon atoms, and $R^2$ to $R^1$ are identical to or different from each other and represent an electron-withdrawing group or a hydrogen atom.

9. The crosslinked rubber molded product according to claim 8, wherein at least one electron-withdrawing group represented by $R^2$ to $R^6$ includes at least one member selected from the group consisting of a halogen group, a perfluoroalkyl group, and a pentafluorosulfanyl group.

10. The crosslinked rubber molded product according to claim 7, wherein a molar ratio (b12/b13) of (b12) the ligand derived from the α,β-unsaturated carboxylic acid compound having 3 to 8 carbon atoms to (b13) the ligand derived from the mercaptobenzothiazole-based compound in (b1) the metal complex ranges from 1.0 to 6.0.

11. The crosslinked rubber molded product according to claim 7, wherein an amount of (b1) the metal complex ranges from 1.0 mass % to 70 mass % in 100 mass % of (b) the co-crosslinking agent.

12. The crosslinked rubber molded product according to claim 7, wherein the rubber composition further contains (f) an organic sulfur compound.

13. A golf ball comprising a constituent member formed from a rubber composition containing (a) a base rubber, (b) a co-crosslinking agent, and (c) a crosslinking initiator, wherein (b) the co-crosslinking agent includes (b1) a metal complex, and (b1) the metal complex is composed of (b11) a metal component, (b12) a ligand derived from an α,β-unsaturated carboxylic acid compound having 3 to 8 carbon atoms, and (b13) a ligand derived from a mercaptobenzothiazole-based compound.

14. The golf ball according to claim 13, wherein (b13) the ligand derived from the mercaptobenzothiazole-based compound includes a ligand derived from at least one member selected from the group consisting of a compound represented by the formula (1), a metal salt of the compound represented by the formula (1), a compound represented by the formula (2), and a metal salt of the compound represented by the formula (2), (1)

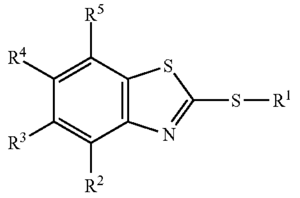

(2)

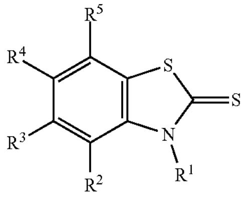

wherein in the formulae (1) and (2), $R^1$ represents a hydrogen atom, an alkyl group having 1 to 8 carbon atoms or an aryl group having 4 to 14 carbon atoms, and $R^2$ to $R^6$ are identical to or different from each other and represent an electron-withdrawing group or a hydrogen atom.

15. The golf ball according to claim 14, wherein at least one electron-withdrawing group represented by $R^2$ to $R^5$ includes at least one member selected from the group consisting of a halogen group, a perfluoroalkyl group, and a pentafluorosulfanyl group.

16. The golf ball according to claim 13, wherein a molar ratio (b12/b13) of (b12) the ligand derived from the α,β-unsaturated carboxylic acid compound having 3 to 8 carbon atoms to (b13) the ligand derived from the mercaptobenzothiazole-based compound in (b1) the metal complex ranges from 1.0 to 6.0.

17. The golf ball according to claim 13, wherein an amount of (b1) the metal complex ranges from 1.0 mass % to 70 mass % in 100 mass % of (b) the co-crosslinking agent.

18. The golf ball according to claim 13, wherein the rubber composition further contains (f) an organic sulfur compound.

19. The rubber composition according to claim 1, wherein (b13) the ligand derived from the mercaptobenzothiazole-based compound includes a ligand derived from at least one member selected from the group consisting of a compound represented by the formula (1), a metal salt of the compound represented by the formula (1), a compound represented by the formula (2), and a metal salt of the compound represented by the formula (2), (1)

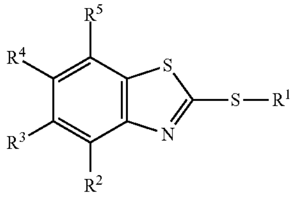

(2)

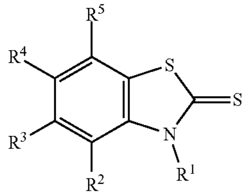

wherein in the formulae (1) and (2), $R^1$ represents a hydrogen atom, an alkyl group having 1 to 8 carbon atoms or an aryl group having 4 to 14 carbon atoms, and $R^2$ to $R^5$ are identical to or different from each other and represent an electron-withdrawing group or a hydrogen atom, a molar ratio (b12/b13) of (b12) the ligand derived from the α,β-unsaturated carboxylic acid compound having 3 to 8 carbon atoms to (b13) the ligand derived from the mercaptobenzothiazole-based compound in (b1) the metal complex ranges from 1.0 to 6.0, and an amount of (b1) the metal complex ranges from 1.0 mass % to 70 mass % in 100 mass % of (b) the co-crosslinking agent.

* * * * *